(12) United States Patent
Kump et al.

(10) Patent No.: US 6,225,006 B1
(45) Date of Patent: May 1, 2001

(54) FAMILY OF LEAD-ACID BATTERIES USING A STANDARDIZED CONTAINER AND HAVING VOLTAGE THAT CAN BE PRESELECTED AS NECESSARY

(75) Inventors: William H. Kump, St. Paul; Steven R. Peterson, Minneapolis, both of MN (US)

(73) Assignee: GNB Technologies, Inc., Mendota Heights, MN (US)

( * ) Notice: Subject to any disclaimer, the term of this patent is extended or adjusted under 35 U.S.C. 154(b) by 0 days.

(21) Appl. No.: 09/354,071

(22) Filed: Jul. 15, 1999

(51) Int. Cl.⁷ .............................. H01M 2/24; H01M 6/42
(52) U.S. Cl. .................. 429/225; 429/160; 429/153; 429/150; 429/129
(58) Field of Search ................... 429/160, 153, 429/150, 225, 129, 130, 146, 148

(56) References Cited

U.S. PATENT DOCUMENTS

| | | |
|---|---|---|
| 1,483,091 | 2/1924 | Imblum . |
| 1,522,743 | 1/1925 | Pettibone . |
| 1,892,962 | 1/1933 | Patterson, Jr. . |
| 2,024,637 | 12/1935 | Geyer ................................. 136/166 |
| 2,065,444 | 12/1936 | Gallant ............................... 136/170 |
| 2,066,010 | 12/1936 | Lindem ................................ 171/97 |
| 2,206,306 | 7/1940 | Sager ..................................... 180/1 |
| 2,637,758 | 5/1953 | Shannon ............................. 136/166 |
| 2,642,469 | 6/1953 | Gary, Jr. ............................. 136/28 |
| 2,713,080 | 7/1955 | Barrett ............................... 136/162 |
| 2,980,751 | 4/1961 | Toce et al. ........................... 136/166 |
| 3,397,089 | 8/1968 | Sasagawa et al. ................... 136/170 |
| 3,546,023 | 12/1970 | Halter et al. ........................ 136/166 |
| 3,711,335 | 1/1973 | Daniel ................................. 136/135 |
| 5,164,273 | * 11/1992 | Szasz et al. . |
| 5,227,263 | * 7/1993 | Blier . |
| 5,424,148 | * 6/1995 | Mrotek et al. . |
| 5,747,189 | * 5/1998 | Perkins . |

* cited by examiner

Primary Examiner—Patrick Ryan
Assistant Examiner—Jonathan Johnson
(74) Attorney, Agent, or Firm—Leydig, Voit, Mayer, Ltd.

(57) ABSTRACT

A method of making lead-acid batteries uses a container standardized for a twelve-volt battery and dual flag straps in the inner cells so that batteries with voltages of two, four, six, or twelve can be preselected as desired, the more preferred embodiments having one terminal cell with either two terminal bases or dual flags so as to minimize the assembly equipment required.

11 Claims, 5 Drawing Sheets

US 6,225,006 B1

FAMILY OF LEAD-ACID BATTERIES USING A STANDARDIZED CONTAINER AND HAVING VOLTAGE THAT CAN BE PRESELECTED AS NECESSARY

FIELD OF THE INVENTION

This invention relates to lead-acid batteries and, more particularly, to a battery assembly and method utilizing a common container size and capable of having a voltage of two, four, six, or twelve volts, as preselected for the particular application.

BACKGROUND OF THE INVENTION

Lead-acid batteries have been in use for a wide variety of applications. For example, such cells and batteries have been used in what are termed "stationary" battery applications wherein the lead-acid cells and batteries provide stand-by power in the event of a power failure. For this type of application, such stationary batteries are maintained at a full state-of-charge and in a ready-to-use condition, typically by float maintenance charging at a constant preset voltage. By way of illustration, such stationary batteries may be used in telecommunications, utilities, and the like. Lead-acid batteries have also been increasingly used in "on-the-road" and "off-the-road" electrical vehicles for forklift trucks, automated guided vehicles, and pure electric vehicles, whereby these batteries supply all the energy requirements. Such applications (often termed "motive power" applications) require repetitive deep discharge cycling.

Further, in some of these applications, the voltage requirements vary from two, four, six, and twelve volts. Commonly, previous designs had used different containers, assembly equipment and elements to achieve the varying voltages.

Utilizing such prior approaches requires the battery manufacturer to have substantial in-plant equipment, tooling, and container molds. Additionally, there are inventory issues to cope with, including maintaining an appropriate inventory of containers. Still further, managing the manufacturing line changeovers to provide the batteries with the desired varying voltages can decrease the productivity.

Issues also arise regarding the ability of conventional lead-acid battery assembly equipment to handle the sheer physical size and/or weight as the plate count is increased to provide the desired voltage. As one illustrative example, an element for a typical 12-volt, BCI Group 27 battery would have 17 plates. The plate count increases as voltage is reduced, viz., a 6-volt battery would have 34 plates/element, a 4-volt battery 51 plates/element, and a 2-volt battery 102 plates/element. This increasing element size and weight cannot be handled by conventional assembly equipment.

Automating the assembly process has been accordingly difficult for applications requiring such varying voltages. This lack of automation presents particular productivity difficulties where the volume of production is relatively small.

There accordingly exists the need for a facile method and battery in which the voltage can be varied from two, four, six, and twelve volts. It would be particularly desirable to develop such methodology in which existing equipment for assembling lead-acid batteries can be used.

Accordingly, it is an object of the present invention to provide a lead-acid battery standardized on a 12-volt element size and container, yet capable of being assembled so as to provide a voltage of two, four, or six, as well.

Another object of this invention is to provide a method for making lead-acid batteries of varying voltage which can be processed using conventional battery assembly equipment.

A still further object lies in the provision of a method for making lead-acid batteries with different selected voltages which substantially reduces manufacturing changeovers and downtime when an application requires the selection of a different voltage.

Other objects and advantages of the present invention can be seen from the following description of the invention.

BRIEF SUMMARY OF THE INVENTION

In general, the present invention utilizes a container standardized for the desired 12-volt element size and element straps having dual flags or tombstones allowing for intercell welds, where appropriate. Utilizing such a standard container and element size, the container partitions can be punched where needed for the intercell connections required to provide the desired voltage selected.

In this fashion, one container and element size can be used while providing batteries having voltages selected from two, four, six, or twelve, as desired for the particular application. Further, and importantly, standard battery assembly equipment can be used to punch the partitions and to provide the necessary intercell welds. Further, cast-on strap machines are available wherein the strap cast has one upstanding flag, and such equipment can be readily modified to provide the necessary dual flag straps used in the present invention.

There is thus provided a facile method of making a series of batteries while minimizing the equipment required as well as the inventory of containers and parts and changeover times.

DESCRIPTION OF THE PREFERRED EMBODIMENTS

Turning to the preferred embodiment shown in FIGS. 1–9, a battery container standardized for a 12-volt battery is utilized. The container is then punched to provide suitable apertures for the intercell welds required to provide the desired voltage, be it two, four, six, or twelve.

Figure 1:
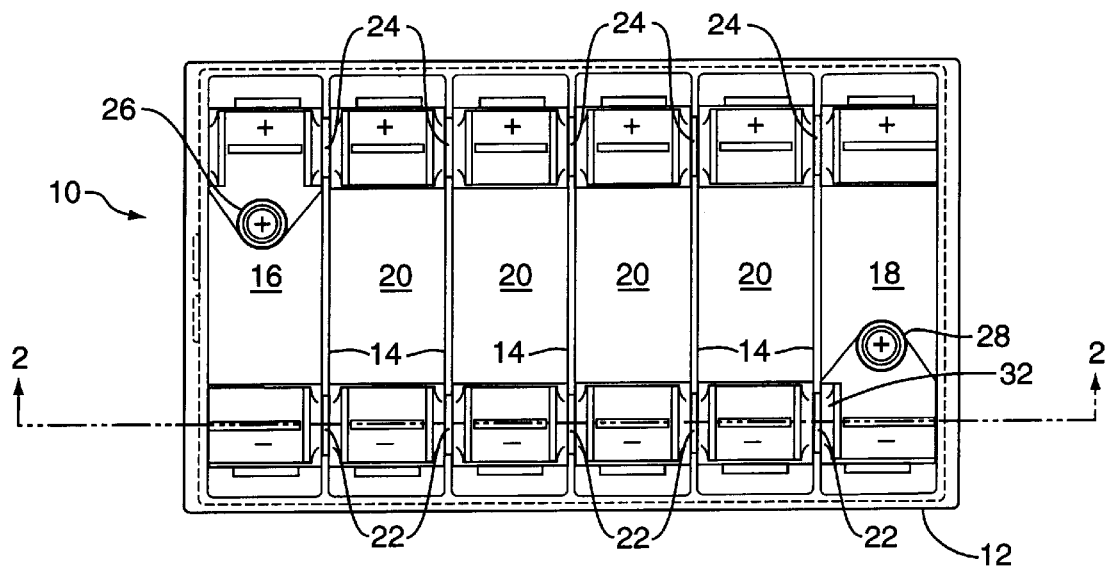
FIG. 1 is a schematic top elevation view of one embodiment of a battery pursuant to the present invention and showing a 2-volt battery.

As is thus shown in FIG. 1, the battery 10 includes a container 12 having partitions 14, dividing the container 12 into six cells. Specifically, terminal cells 16 and 18 are provided, along with four internal cells 20, each containing an element (not shown) comprising positive and negative plates with separators therebetween.

Other than as discussed herein, the specific configurations and components used for the lead-acid batteries do not form a part of the present invention. Thus, suitable container materials, positive and negative grid alloys and separator materials are known and may be used, as considered appropriate for particular applications.

According to one aspect of the present invention, the container 12 is punched to provide appropriate openings or apertures for the intercell welds needed to provide the desired voltage. To this end, in the embodiment shown in FIGS. 1–3, and as particularly can be seen in FIG. 1, each of the partitions 14 have been punched so that the elements in each cell are connected together, so as to provide a 2-volt battery. As shown, each of the negative plates in the respective cells are connected via intercell welds 22. Similarly, each of the positive plates in each cell are electrically connected from cell-to-cell via intercell welds 24, as will be more fully described hereinafter.

As can be seen from FIG. 1, positive terminal 26 in this 2-volt configuration is located in terminal cell 16 while negative terminal 28 is positioned in terminal cell 18. According to another aspect of the present invention, and as can be best seen in FIGS. 2 and 5, the terminal positioned in terminal cell 16 comprises a strap base 30 and upstanding dual flags 32, sometimes termed "tombstones" due to the shape. By utilizing one of the terminal cells with dual flags, the terminal can be utilized in either direction, as needed for the voltage required for the intended application. Accordingly, the same casting equipment and terminal-building equipment can be used. Stated differently, whether the terminal is positioned as is shown in FIG. 1, or is located in the other corner of terminal cell 16, as is needed for two of the four voltage levels, the same equipment can be used since, in effect, the terminal is just turned around.

Figure 3:
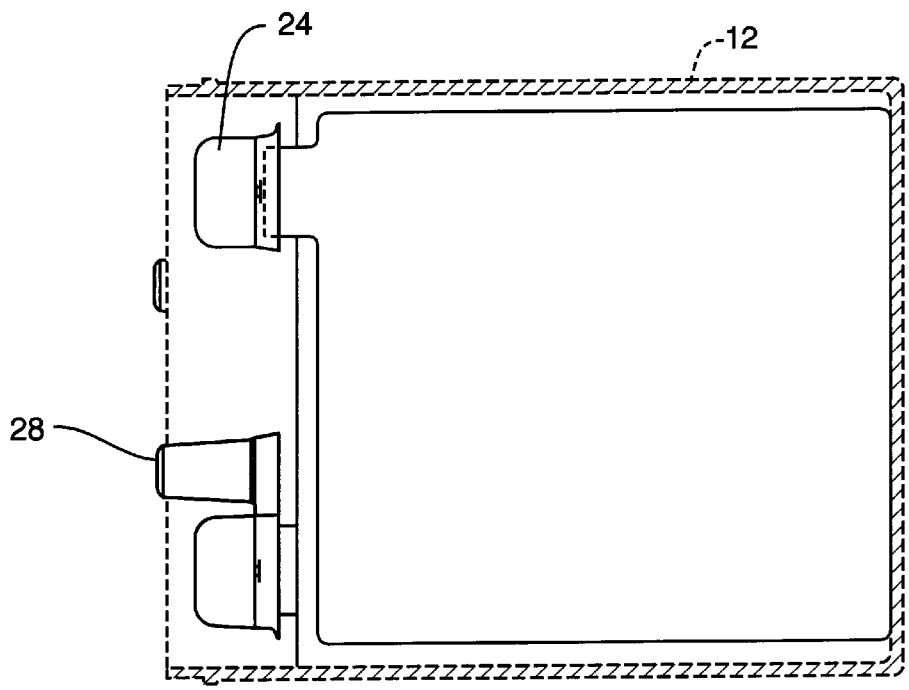
FIG. 3 is an end elevation view of the battery in FIG. 1 and showing the positioning of the negative terminal relative to the intercell welds and strap.
Figure 4:
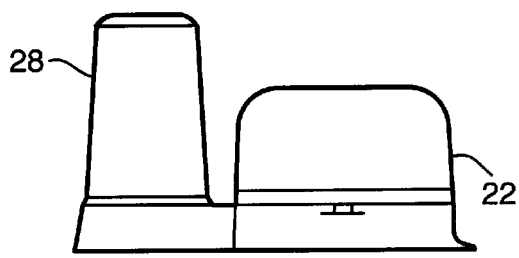
FIG. 4 is a schematic view further showing the negative terminal.
Figure 5:
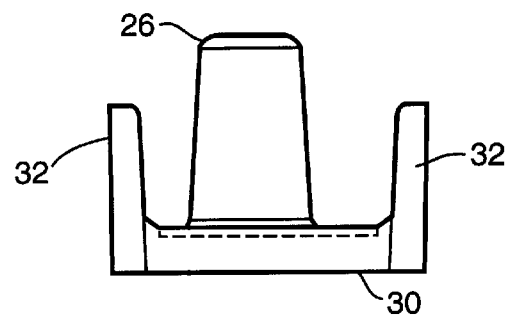
FIG. 5 is a schematic view of a terminal having dual flags, which for the embodiment of FIG. 1, is the positive terminal.

In this embodiment, as can be seen in FIGS. 1, 3, and 4, the terminal is offset from the location of the intercell weld 22. The particular location of the terminals and equipment used to provide the terminals are known and may be utilized.

As will be seen when describing the other voltage configurations using this embodiment, only one terminal cell (terminal cell 16 as illustrated in FIG. 1) needs to be provided with dual flags. Thus, as will be seen, the terminal located in terminal cell 18 is located in the same position, regardless of the voltage selected. For the 2-volt embodiment of FIG. 1, terminal 28 thus only has one flag 32, positioned to be adjacent partition 14 of container 12 so as to allow for intercell weld 22.

Figure 2:
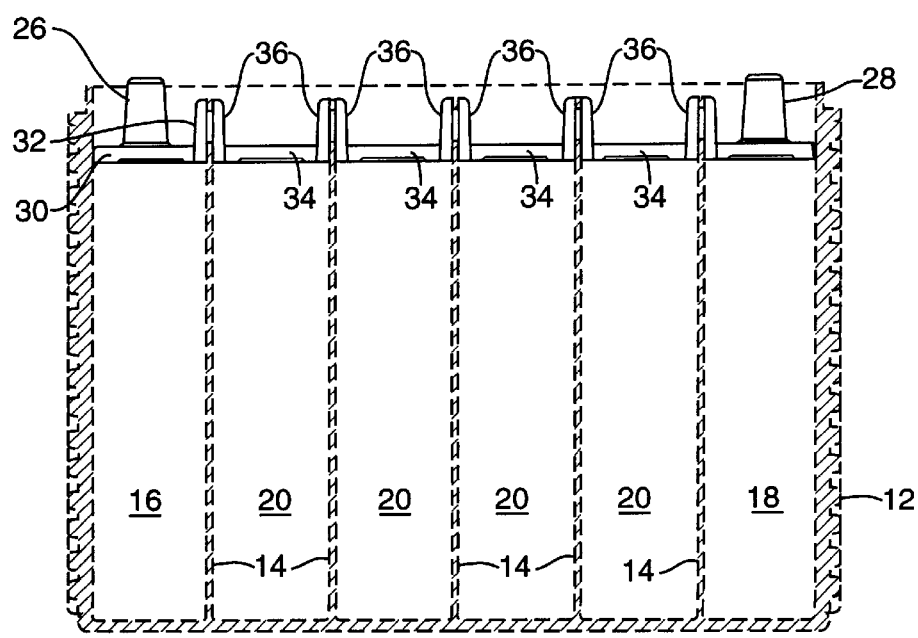
FIG. 2 is a cross-sectional view taken generally along the line 2—2 of FIG. 1 and showing the dual flag straps and intercell welds.
Figure 6:
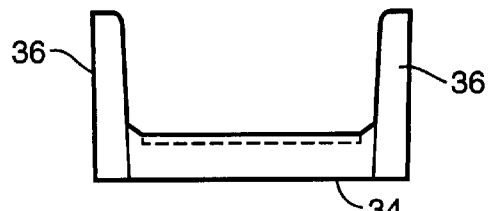
FIG. 6 is a schematic view of the strap with dual flags.

A still further aspect of the present invention utilizes, as previously noted, straps having dual flags for each of the four internal cells. In this fashion, whether necessary or not for a particular voltage selection, the same equipment and container can be used. As is best seen in FIGS. 2 and 6, the straps located in interior cells 20 comprise a base 34 electrically connected to the lugs of the appropriate plates (as can be best seen in FIG. 3). Upstanding dual flags 36 are provided, positioned adjacent to partitions 14 so as to allow for intercell welds, where appropriate for the particular configuration.

As also noted, the straps in lead-acid battery assembly operations are automatically made utilizing cast-on-strap equipment. Useful equipment is well known and is commercially available. Such equipment may be readily modified so as to achieve dual flags, as utilized in the present invention. However, so long as the dual flag configuration is provided, the internal cell straps can be made using whatever technique and equipment is desired.

When a 4-volt configuration is required, all of the same components can be utilized as previously described. However, for a 4-volt configuration, the terminal having the dual flags needs to be turned around since it is located in the opposite corner of the terminal cell, and one internal partition is not punched since no intercell weld is required in that location. The 4-volt configuration is shown in FIG. 7, and the same components used are designated with the same numerals.

Figure 7:
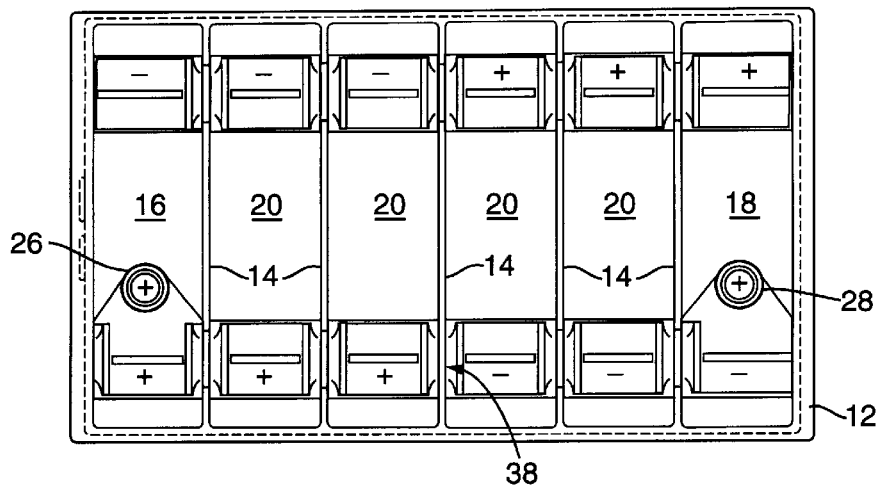
FIG. 7 is a top elevation view of a battery similar to FIG. 1, except showing the intercell welds such that the voltage of the battery is four.

In this embodiment, as seen in FIG. 7, positive terminal 26 is located in the corner of terminal cell 16 opposite to that of the 2-volt configuration shown in FIG. 1. Similarly, there is no intercell weld connecting the middle partition 14 as can be seen at 38. As can be seen from the respective intercell welds and the positive and negative polarity designations, a 4-volt configuration is provided, utilizing the same components and capable of being made with the same equipment.

Figure 8:
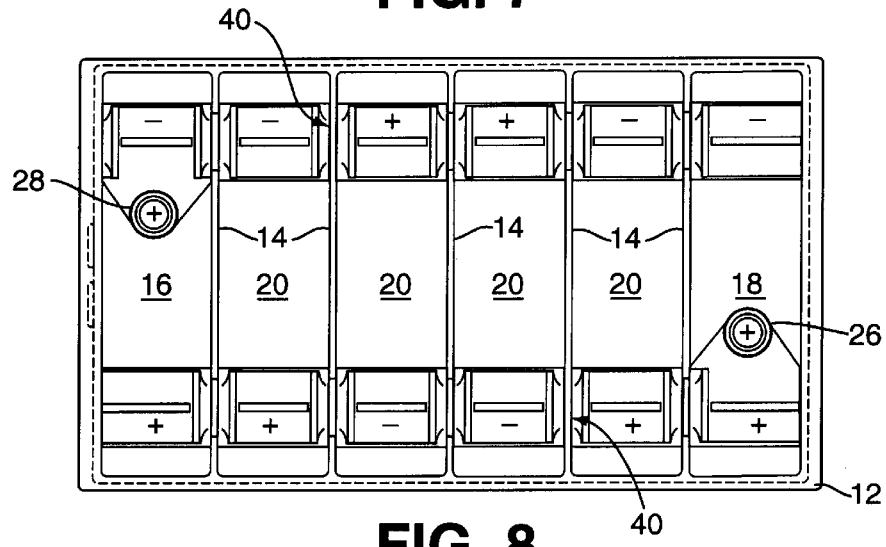
FIG. 8 is a top elevation view of a battery similar to FIG. 1, except showing the intercell welds such that the voltage of the battery is six.

Similarly, as can be seen from FIG. 8, a 6-volt configuration can be provided. Thus, in the 6-volt configuration, terminal cell 16 contains the negative terminal 28, located in the same position as in the two-volt battery shown in FIG. 1. The 6-volt configuration is achieved by not punching apertures for intercell welds in the two partition locations identified by 40. Also, as is in the 4-volt configuration, the elements are positioned in the cells so that the negative plates and positive plates are in the locations needed for this desired voltage. Again, utilizing the same equipment and components as for the other batteries in this family, a 6-volt configuration can be readily provided.

Figure 9:
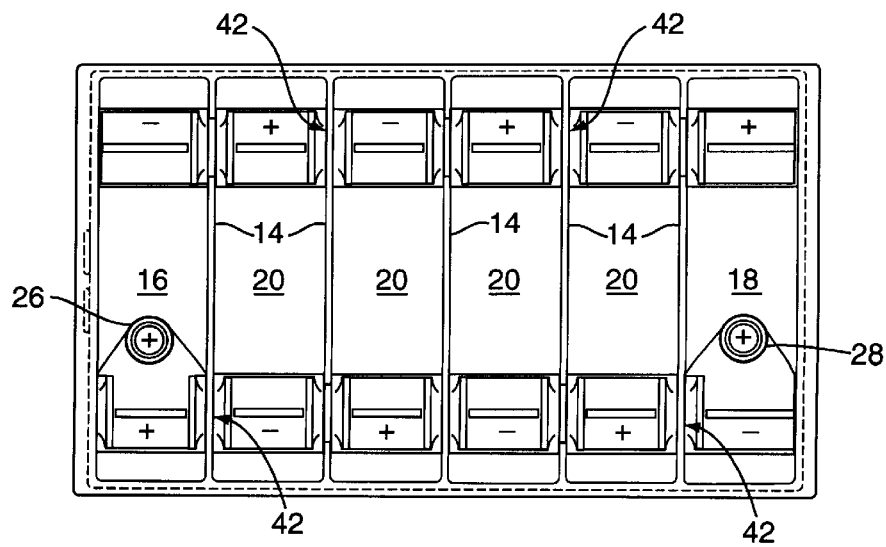
FIG. 9 is a top elevation view of a battery similar to FIG. 1, except showing the intercell welds such that the voltage of the battery is twelve.

Similarly, as seen in FIG. 9, a 12-volt configuration can be achieved merely by locating the positive terminal 26 in the same location as shown in FIG. 7, not punching a hole for an intercell weld in the locations indicated by 42 and by appropriate insertion of the elements to provide the respective location of the positive and negative plate lugs as can be seen by the polarity designations. Here again, where the application requires a 12-volt configuration, the same container, components and equipment can be utilized as are employed when batteries with the other selected voltages.

FIGS. 10–15 show a further embodiment of the batteries of the present invention. As in the initial and preferred embodiment, the same components and equipment may be utilized to achieve whatever voltage is desired.

However, in this embodiment, each of the terminals is formed with only a single flag. Accordingly, in this embodiment, straps are cast, or otherwise provided, in two locations in one of the terminal cells. Then, a terminal of the appropriate polarity is provided, utilizing the location necessary to achieve the particular voltage.

Figure 10:
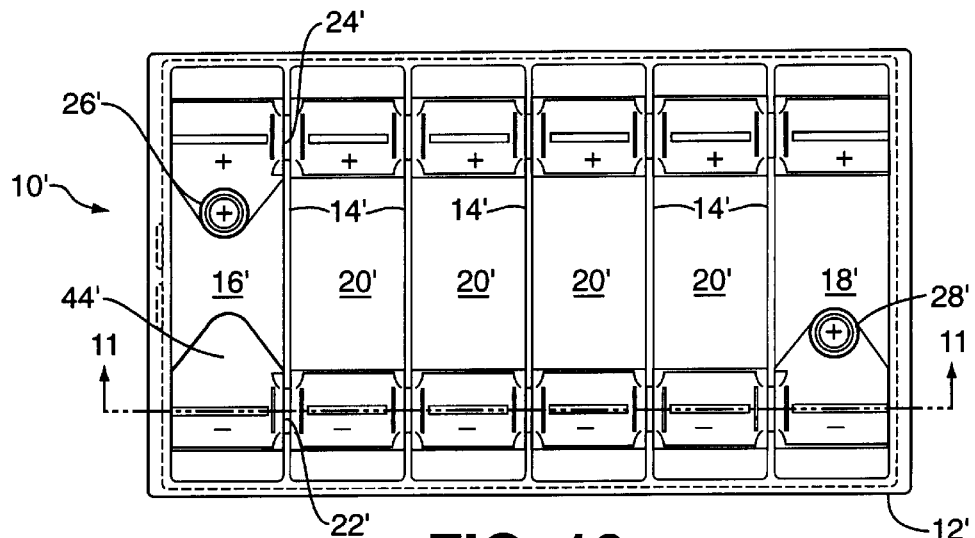
FIG. 10 is a top elevation view showing another embodiment of a battery of the present invention wherein the terminal straps each have only one flag and utilizing, in one terminal cell, an additional terminal strap base capable of being used to provide the terminal configuration required as the voltage for the battery desired is altered.
Figure 11:
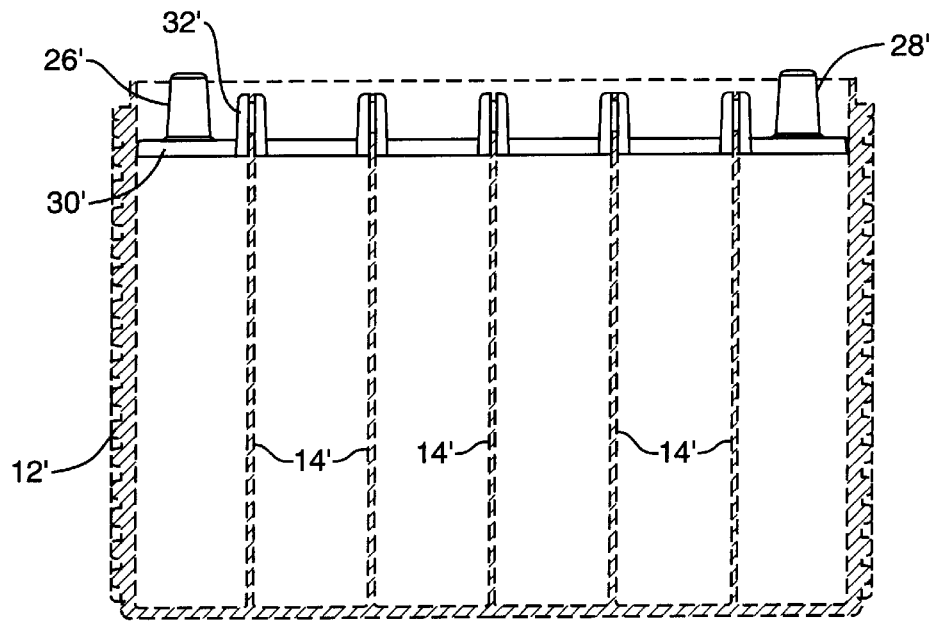
FIG. 11 is a cross-sectional view taken generally along the line 11—11 of FIG. 10 and further showing the battery of FIG. 10.
Figure 12:
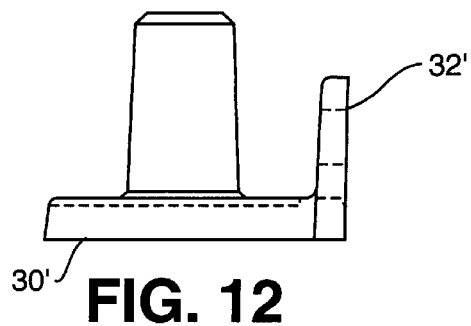
FIG. 12 is a schematic view of the terminal with a single flag.
Figure 13:
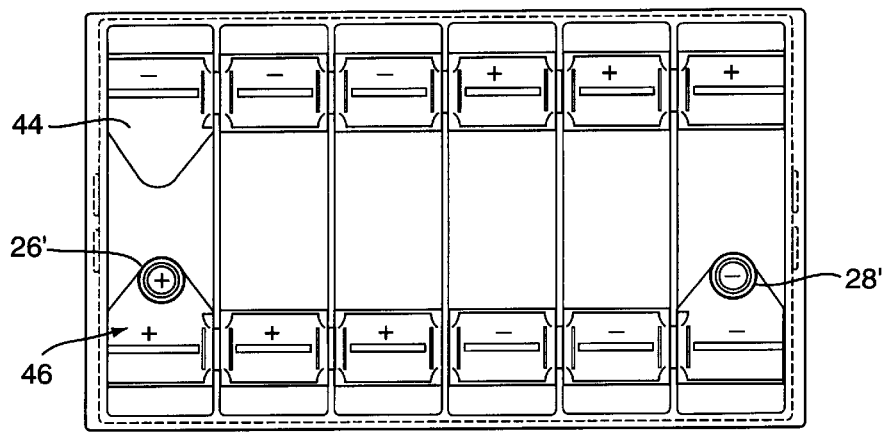
FIGS. 13–15 are top elevation views similar to FIG. 10, except showing the terminal configurations and intercell welds for 4-volt, 6-volt, and 12-volt batteries.

To this end, as can be seen in FIGS. 10–12, a 2-volt configuration is provided. For simplicity, in this embodiment, each of the components described in conjunction with the preferred embodiment is identified by the same numerals except using primes, even though the same container, the dual flag straps and intercell welds and assembly position of the elements as used in the preferred embodiment are utilized.

Thus, as seen in FIGS. 10–12, container 12' is divided by partitions 14' into a terminal cell 16', a terminal cell 18' and internal cells 20'. Positive terminal 26' is located in terminal cell 16', and negative terminal 28' is located in terminal cell 18'. Each of the partitions 14' have been punched so as to allow for intercell welds 22' and 24'.

In this embodiment, each of the terminals only has a single flag, as best seen in FIGS. 11 and 12. The strap thus comprises a base 30' and an upstanding flag 32'. Because the terminal strap only includes a single flag, this can only be used in one location and cannot be reversed as in the preferred embodiment. Accordingly, in this embodiment, equipment is utilized which provides a strap base 44', so that a terminal may be provided in one of the two locations necessary for achieving the various voltages.

Figure 14:
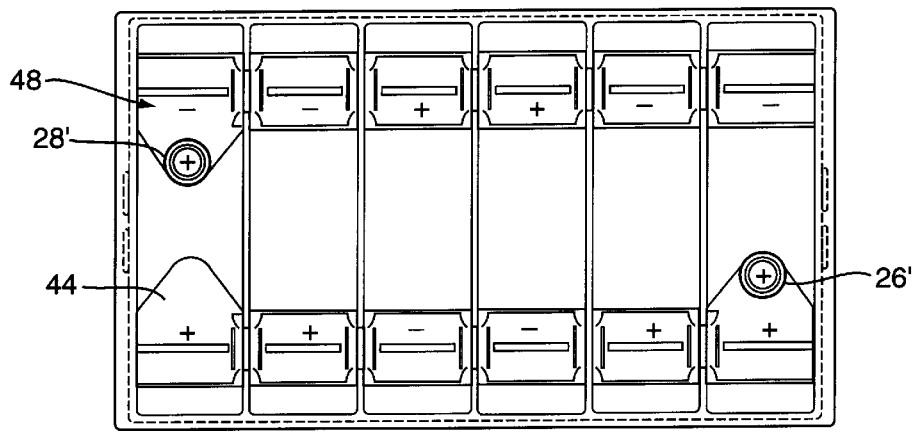
Figure 15:
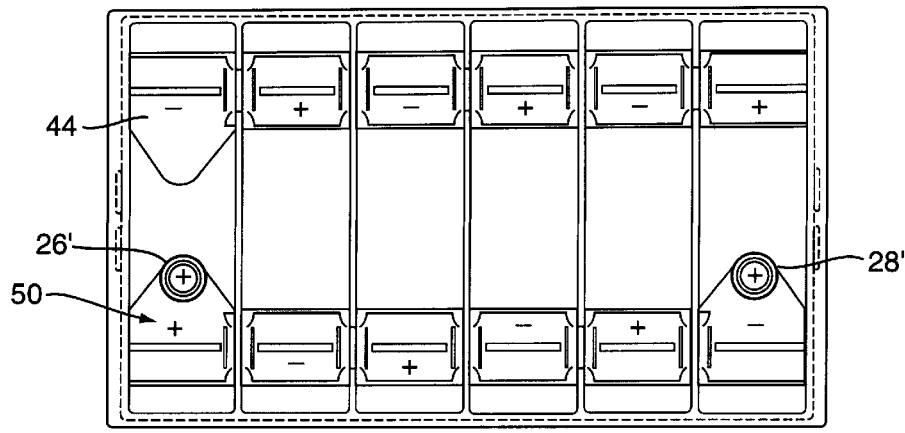

When four, six, or twelve volt configurations are needed, the same container punching (i.e., punching to provide an aperture in those locations where an intercell weld is needed for the selected battery voltages), intercell welds and terminal locations are utilized as in the initial, and preferred, embodiment. The sole difference is the location of the terminal in terminal cell 16'. Thus, for a 4-volt configuration, the positive terminal 26' is located in the position shown at 46. The other terminal base 44' is not utilized. Where a 6-volt configuration is needed, as seen in FIG. 14, the negative terminal is located in terminal cell 16' as indicated by arrow 48. A 12-volt configuration is achieved by locating the positive terminal in the location shown in FIG. 15 as indicated by 50.

This alternative embodiment, just as does the preferred embodiment of FIGS. 1–9, minimizes the cast-on-strap equipment needed. In the preferred embodiment, in addition to the use of dual flag straps for the interior cells, such minimization is achieved by providing one terminal with dual flags as well. In the embodiment of FIGS. 10–15, such minimization is achieved by providing one terminal cell with two terminal bases located so that the appropriate location for the selected voltage can be used to form the terminal, the other terminal base being unused.

While less preferred, it should be appreciated that this two terminal base configuration could be eliminated, if desired. However, as may be appreciated, such an approach would require providing an additional cast-on-strap mold so that the two terminal locations required for the four different voltages can be made.

Thus, as has been seen, the present invention provides a method for making a family of batteries having a voltage as desired, utilizing a common container, components and equipment. The economies achieved through using the invention can be substantial, both in terms of simplifying equipment and inventory requirements.

The size and the number of plates can be varied as is necessary to achieve the capacity and other electrical requirements. By way of example, as previously referenced, 17-plate elements in a BCI Group 27 container is suitable. However, the number of plates in the element and the container size can be varied as is considered necessary to satisfy the electrical requirements of a particular application. Simply by way of illustration, the number of plates per element often will vary from about 11 to 17.

While the present invention is susceptible to various modifications and alternative forms, specific embodiments thereof have been described in detail herein. It should be understood, however, that it is not intended to limit the invention to the particular forms disclosed, but, on the contrary, the intention is to cover all modifications, equivalents and alternatives falling within the spirit and scope of the invention as expressed in the appended claims. Thus, as has been seen, the battery container utilized to achieve the present invention in the illustrative embodiments comprises a container standardized for a 12-volt battery, arranged in what is termed a "1×6" configuration (i.e., the cells are adjacent each other in a single row rather than being side-by-side in two or three rows). It should be appreciated that the present invention is equally applicable to employing a container standardized for a 6-volt battery (1×3 configuration) and then punching to allow intercell welds for either a 6-volt or a 2-volt battery. Thus, the 6-volt container would have positive and negative terminals cells 16 and 18, with one internal cell 20.

We claim:

1. A lead-acid storage battery having a preselected voltage of two, four, six, or twelve volts and desired electrical performance, which comprises a container standardized for a 12-volt battery and having internal partitions dividing the container into six cells, four inner cell and two terminal cells, the container being sized to allow the desired electrical performance for the assembled battery, a lead-acid element positioned in each cell comprising positive and negative plates and a separator therebetween and providing the desired electrical performance for the assembled battery, each of the positive and negative plates having lugs for electrical connection to a strap, at least each of the inner cells having a strap comprising a base for electrical connection to one of the sets of positive and negative lugs in each cell and dual upstanding flags positioned adjacent the opposing partitions forming the cell, a positive terminal in one terminal cell, a negative terminal in the other of said terminal cells, each of said internal partitions having openings forming intercell welds with said flags, said openings and intercell welds having been selected to provide a voltage for the battery of two, four, six, or twelve volts.

2. The battery of claim 1 wherein the strap and terminal in one of the terminal cells has upstanding dual flags, each flag capable of providing an intercell weld when located in the terminal cell such that such flag is adjacent a container partition.

3. The battery of claim 2 wherein the voltage preselected is two.

4. The battery of claim 2 wherein the voltage preselected is four.

5. The battery of claim 2 wherein the voltage preselected is six.

6. The battery of claim 2 wherein the voltage preselected is twelve.

7. The battery of claim 1 wherein one terminal cell includes two terminal bases for accommodating a terminal and located in the terminal cell such that one terminal base has a terminal thereon.

8. The battery of claim 7 wherein the voltage preselected is two.

9. The battery of claim 7 wherein the voltage preselected is four.

10. The battery of claim 7 wherein the voltage preselected is six.

11. The battery of claim 7 wherein the voltage preselected is twelve.

* * * * *